United States Patent
Safadi (10) Patent No.: US 6,742,121 B1
(45) Date of Patent: May 25, 2004

(54) DETECTION OF SUSPECT SOFTWARE OBJECTS AND SIGNATURES AFTER FAILED AUTHENTICATION

(75) Inventor: Reem Safadi, Horsham, PA (US)

(73) Assignee: General Instrument Corporation, Horsham, PA (US)

(*) Notice: Subject to any disclaimer, the term of this patent is extended or adjusted under 35 U.S.C. 154(b) by 0 days.

(21) Appl. No.: 09/389,107

(22) Filed: Sep. 2, 1999

Related U.S. Application Data (63) Continuation-in-part of application No. 09/257,274, filed on Feb. 24, 1999, now Pat. No. 6,256,393.

(51) Int. Cl.$^7$ ............................................... H04L 9/00
(52) U.S. Cl. .......................... 713/187; 713/176; 713/181
(58) Field of Search ................................. 713/168, 176, 713/179, 181, 187

(56) References Cited

U.S. PATENT DOCUMENTS

| | | | |
|---|---|---|---|
| 4,712,239 A | | 12/1987 | Frezza et al. |
| 5,003,591 A | | 3/1991 | Kauffman et al. |
| 5,343,527 A | * | 8/1994 | Moore ........................ 713/179 |
| 5,572,590 A | | 11/1996 | Chess |
| 5,606,609 A | * | 2/1997 | Houser et al. ............... 713/179 |
| 5,757,914 A | * | 5/1998 | McManis .................... 713/187 |
| 5,870,474 A | * | 2/1999 | Wasilewski et al. ......... 380/211 |
| 6,005,938 A | * | 12/1999 | Banker et al. ............... 380/239 |
| 6,092,194 A | * | 7/2000 | Touboul ....................... 713/200 |
| 6,105,134 A | * | 8/2000 | Pinder et al. ................ 713/170 |
| 6,154,844 A | * | 11/2000 | Touboul et al. ............. 713/201 |
| 6,157,719 A | * | 12/2000 | Wasilewski et al. ......... 380/210 |
| 6,252,964 B1 | * | 6/2001 | Wasilewski et al. ......... 380/282 |
| 6,256,393 B1 | * | 7/2001 | Safadi et al. ................ 380/232 |
| 2002/0078351 A1 | * | 6/2002 | Garib .......................... 713/168 |

FOREIGN PATENT DOCUMENTS

| | | | | |
|---|---|---|---|---|
| EP | 0 827 329 | | 3/1998 | |
| WO | WO 01/16673 | * | 3/2001 | ............. G06F/1/00 |

\* cited by examiner

Primary Examiner—Emmanuel L. Moise
Assistant Examiner—Christopher Revak
(74) Attorney, Agent, or Firm—Barry R. Lipsitz (57) ABSTRACT

In a system for authenticating a downloaded software object, a technique is provided to determine whether a failed authentication resulted from a suspect downloaded object or a suspect signature for the downloaded object which was communicated separately. A secret compact transformation function that operates on the signature is used to generate a value indicative of the signature at the software object transmission facility. The inverse function is used at the user terminal, such as a television set-top box, which receives the downloaded software object. Multiple transmission of the value can be provided for redundancy. The system is particularly useful in analyzing actual or attempted attacks on the security of the software object download scheme.

15 Claims, 6 Drawing Sheets

DETECTION OF SUSPECT SOFTWARE OBJECTS AND SIGNATURES AFTER FAILED AUTHENTICATION

"This application is a continuation in part of commonly assigned, U.S. patent application No. 09/257,274 filed Feb. 24, 1999 (now U.S. Pat. No. 6,256,393 issued on Jul. 3, 2001)."

FIELD OF THE INVENTION

The present invention relates to methods and apparatus for facilitating the detection of suspect software objects and/or suspect object signatures.

Such software objects may include, but are not limited to, application code, operating systems and associated components (e.g. dynamic link libraries—DLL's), Basic Input/Output Structures (BIOS), Java Virtual Machines (JVM), Java applications and applets, etc., residing in television set-top terminals. These objects (and/or their associated signatures) can be rendered "suspect" by tampering, which generally occurs when a "pirate" or "hacker" attempts to defeat the security of the system over which the objects are communicated. An object or signature that is suspect has questionable validity and cannot be trusted.

BACKGROUND OF THE INVENTION

As digital set-top terminals for cable and satellite television (e.g., the DCT5000+ provided for cable television systems by General Instrument Corporation of Horsham, Pa., U.S.A.) incorporate the capability to download different operating systems (e.g., Microsoft's WinCE), DLL's, JVM's, multiple system cable operators (MSO's) need a mechanism that will allow them to maintain control of the features, applications, and software objects in general that run or are utilized within these set-top terminals. More specifically, MSO's want the ability to access control services and associated usage of software objects in set-top terminals.

One known attempt to address the authenticity of code objects for the PC environment is Microsoft's "Authenticode" capability. This product enables software vendors to acquire a digital signature for published executable code. Authenticode provides a digital signature with only one signer; the code is signed with Microsoft's private key (which is not published) and is verified with Microsoft's public key, which is bundled into the Authenticode verification code in the operating system. However, while Authenticode provides digital signature protection for executable code, it does not provide any means of determining access requirements for the executable code for access control purposes (and revenue generation purposes), and it is applicable only to executable code.

A second known attempt to address control of Java applets is "Java Security" which is intended to prevent applets from inspecting or changing files on a client system and from using network connections to circumvent file protections or data privacy measures. However, as is the case with Authenticode, Java security does not offer authentication of any software object unless it is Java based, nor does it offer the association with access requirements for access control and revenue generation purposes.

Although each of the products described above attempt to address protection and control of software objects against unauthorized utilization in a PC environment, they do not fully address the issues associated with authorization, authentication and access control, and thus, do not provide an optimal solution that meets MSO requirements.

As set-top terminals assume a computing environment for entertainment purposes by utilizing downloadable software objects such as operating systems, libraries, Java Virtual Machines, applications, applets, etc., it becomes extremely critical to protect and control the software object to guard against unauthorized utilization by a given set-top terminal. Not only does the identity of each software object require authentication but also, its utilization has to be subject to MSO control via authorization permissions along with control of which set-top terminal resources a given software object may use. These measures complement those of object validation and verification and ensure that software objects that have not been authenticated are not utilized. To the extent that these measures are utilized, the set-top terminal is no longer subject to problems associated with objects that have failed to follow the security design rules, or worse yet, those which may be contaminated with a virus that is meant to cause harm to the MSO's network and associated set-top terminals.

Commonly assigned, copending U.S. patent application Ser. No. 09/257,274 filed Feb. 24, 1999 discloses methods and apparatus for creating a signature and associating the signature with a software object that is to be downloaded and used in a set-top terminal. A conditional access subsystem in the set-top terminal is provided with the appropriate routines to examine the validity of the signature by comparing (i) the signature sent from, e.g., a television system headend to (ii) a signature generated locally at the set-top once the object has been downloaded. In the event a check failed, there was no way of determining whether (a) the downloaded object was suspect or (b) the signature with the message that delivered it was suspect.

It would be advantageous to provide a scheme for determining, when an authentication operation fails in a set-top terminal, whether the object being authenticated or the received signature has been suspect. The present invention provides methods and apparatus having the aforementioned and other advantages.

SUMMARY OF THE INVENTION

In accordance with the invention, a method is provided for analyzing a failed software object authentication to determine whether the software object or a signature for the software object is suspect. A transmitted software object signature value s is extracted from a message m(s) carrying the signature value s. An object signature value s' is separately calculated from the software object. A value v equal to the result of a secret signature transformation function f(s), operating on signature s, is extracted from the software object. A signature value s" is generated by applying the inverse $f(s)^{-1}$ of the signature transformation function f(s) to the extracted value v. The value of the signature sent in m(s) is compared with the calculated signature value s'. If the two are equal, then the authentication has been validated. If not, the following additional steps are taken. The signature value s" is compared to s'. If the two are equal then the likelihood is that the signature value s in the sent message m(s) was suspect. If the value of s" equals the sent signature value s in m(s) then the likelihood is that the object itself is suspect. In other words the signature value in message m(s) is designated as suspect if s"=s'. Conversely, the software object is designated as suspect if s"=s.

In one particular embodiment, first and second copies of the value v are carried at different locations of the software object for redundancy. Each, of the copies is extracted from the software object. The signature value s" corresponds to the first copy of the value v. A second signature value, $s_2''$ is generated for the second copy of the value v. The method of this embodiment includes the further step of comparing the signature value $s_2''$ to at least one of the transmitted object signature values s and the calculated object signature value s'. The signature value in message m(s) is designated as suspect if $s_2''=s'$. The software object is designated as suspect if $s_2=s$. Both the signature associated with the software object and the message m(s) can be designated as suspect if $s_2''$ does not equal either s' or s, although it should be appreciated that this is the least likely case and is not as deterministic since. $s_2''$ may be suspect as well. In such an embodiment, the value v can, for example, be appended at the beginning of the software object and at the end of the software object, although other locations may be equally satisfactory.

Alternate embodiments and corresponding apparatus is also provided.

DETAILED DESCRIPTION OF THE INVENTION

In order to prevent piracy of information signals, such as cable or satellite television signals, access control capabilities must be extended to downloaded software objects in user terminals. In a cable television environment, such user terminals are known as set-top boxes. However, the present invention is not limited to such set-top boxes, and it is easily adapted and applicable to other end user devices. An objective of access control in accordance with the invention is to allow use of downloaded software objects only when such use is authorized and the objects pass authentication checks.

Access control of a software object, in accordance with one aspect of the invention, consists of three parts. The first defines the access requirements for a particular service (and associated objects), and the second defines the authorization rights for a particular user terminal to access these services (and associated objects). The third provides additional identification information to enable the user terminal (e.g., set-top box) to authenticate the objects prior to their utilization. The access requirements may be considered as the lock, and the authorization rights may be considered as the key. When the authorization rights match the access rights (and no parental control is required), the user terminal is allowed to access the service (and associated objects).

There are two types of messages that facilitate the access control function. The first such message, known as the Entitlement Control Message (ECM), delivers the Entitlement Control Structure (ECS) (explained in further detail below) which contains the Entitlement Control Record (ECR) (also explained in detail below) for the associated objects. The ECS also lists the entitlement information required for service access (e.g., television program viewing) or the use of object(s). The second message, the Entitlement Management Message (EMM), delivers the entitlements purchased by or granted to the consumer. The functions of each of these messages are described in greater detail below.

The following provides an outline of how software objects are authorized to run after authentication has been established. All software objects that are not authorized (and authenticated) in this manner are not recommended for use in the set-top box or other end user devices. In the event that all preventive measures intended to keep unauthorized software objects from residing within the user terminal fail, this approach aids in detecting such applications and in preventing their utilization or execution.

In a digital user terminal, the utilization of all software objects (including applications associated with a given service) must be authorized by the access control system. The software object is specified to consist of downloadable code or data that may be utilized in the user terminal at either the subscriber's or the MSO's will.

Figure 1:
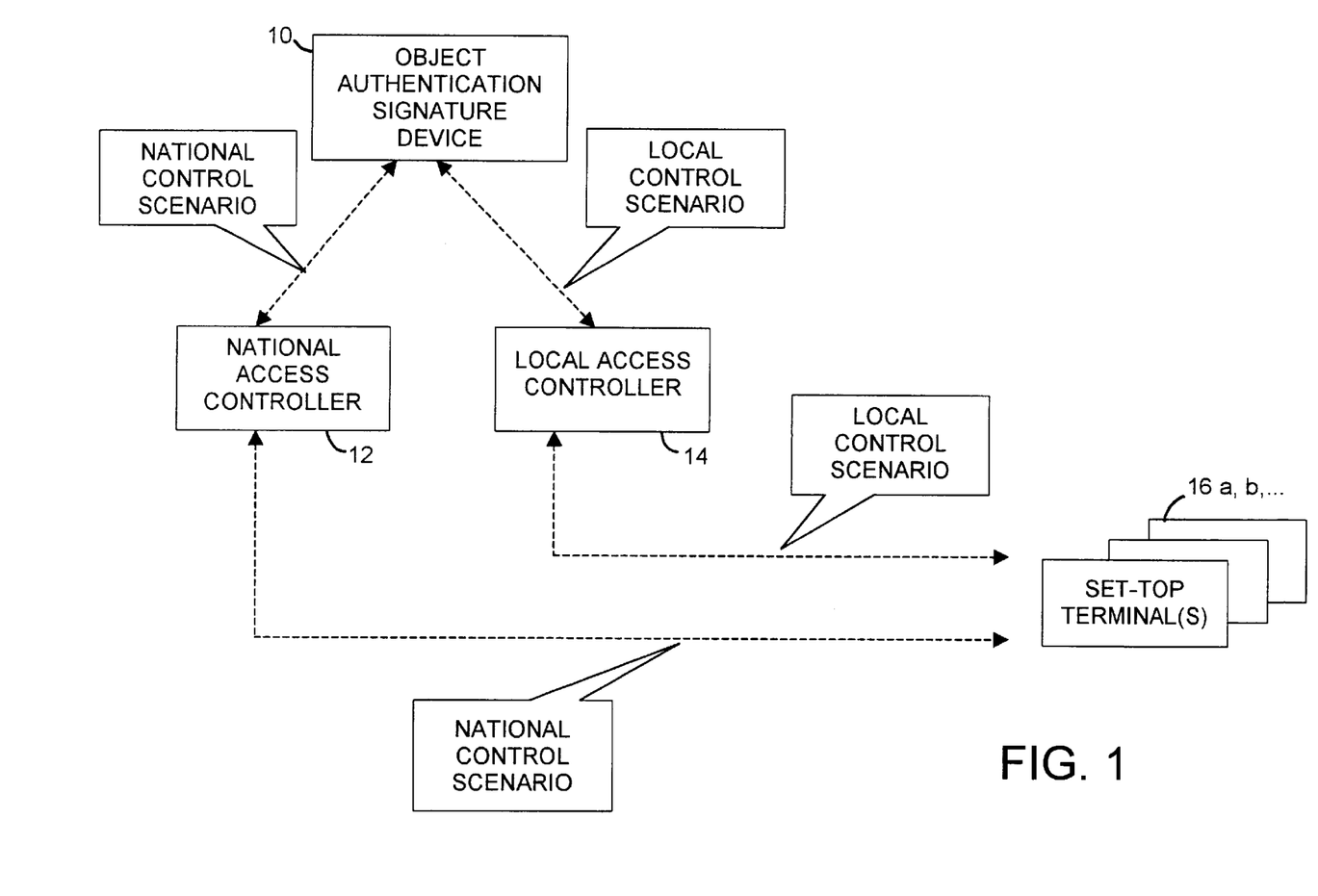
FIG. 1 is a simplified block diagram illustrating the logical paths of a cable television system relevant to the description of the invention.

First, as illustrated in the block diagram of FIG. 1, an Object Authentication Signature Device 10 (OASD) utilizes either a National Access Controller 12 (NAC) (in the national control scenario) or a Local Access Controller 14 (LAC) (in the local control scenario) which in turn communicate with a number of set-top terminals 16a, 16b, etc for initialization, service configuration, administration and a variety of other functions. The details of the interactions of each of these devices are described in detail hereinafter.

Figure 2:
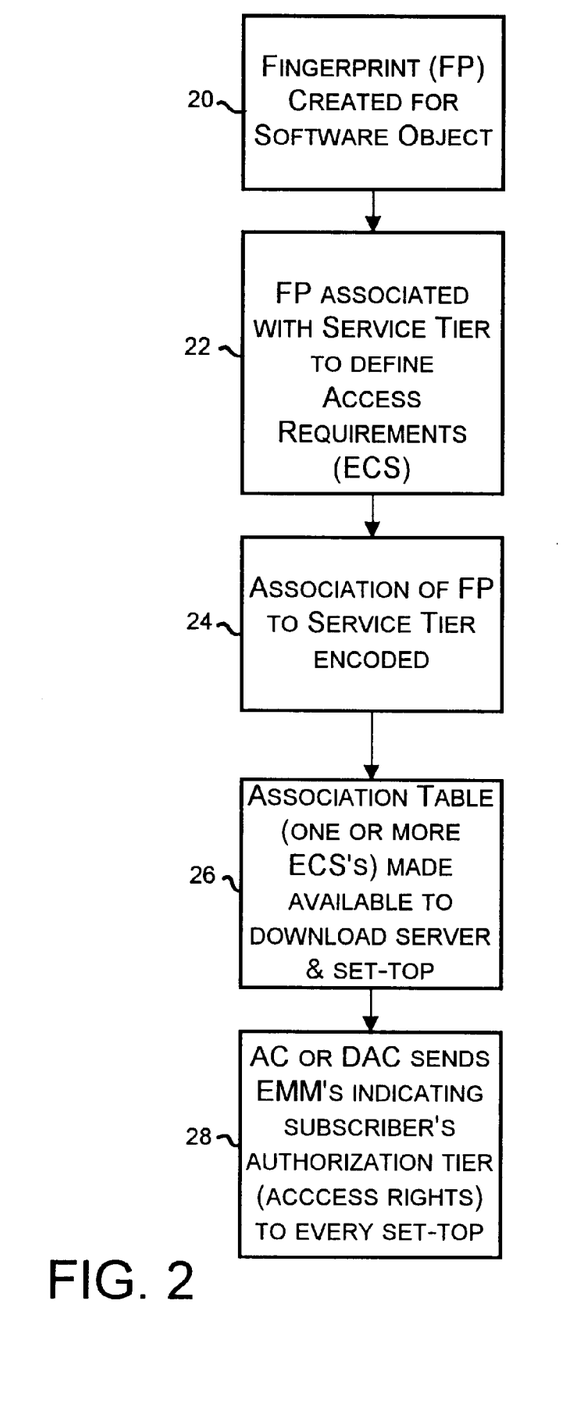
FIG. 2 is a simplified flow chart illustrating the steps performed by a multiple system cable operator (MSO) to provide authorization and access control of software objects in set-top terminals.

Referring to the flow chart of FIG. 2, in step 20, a "fingerprint", i.e., a digital signature, is created for each software object-(e.g., applications, OS's, DLL's, JVM's, Java applications and applets, etc.). The fingerprint (signature-) of the software object serves as a unique Entitlement Control Record (ECR). For example, each software object that the system operator (e.g., MSO) wants to place in this category, i.e., under access control, is associated with a "fingerprint". Note that the fingerprint might simply be a seed for a key that could be encrypted by known means, or, it could be a value that is derived from an initial value through processing it as an image or otherwise (i.e., the fingerprint may include object size, checksum, etc.).

In particular, the fingerprint (a digital signature) may be generated by a software/hardware object authentication/ signature device (OASD). This is performed after the software object is verified and validated (e.g., through inspection, testing, etc. as well known in the art). The intent of the software verification and validation is to ensure that the design and implementation of the object follows a pre-specified set of rules and requirements established for security purposes. This may be done under contract to the system operator.

The signature may be based on a unique (which may or may not be system-operator-specific) object identifier and a cryptographic cyclic redundancy code (CRC) of the object, and serves as a form of certification that is unique to the software object itself. Any well known signing technique may be employed, as will be appreciated by those skilled in the art. If several software objects are associated with a service, each may be associated with a signature, and then an overall signature may be provided for the entire suite, whenever authentication of this higher level association is desired.

Continuing to step 22 of FIG. 2, the fingerprint of each software object is associated with a service tier. Both satellite and cable television access control systems utilize the concept of "tiering". For audiovisual services, a tier is a logical grouping of programs or services (the degenerate case being a single program or service). The grouping is created to facilitate control of the user's (subscriber's) access to that group of services based upon the MSO's subscriber profile (i.e., which services are subscribed to by a given consumer). The access rights of the user would demand a great deal of memory in the set-top terminal if the access rights were stored as separate flags for each and every program or object available. The tiers are typically represented as single binary digits (bits) that can be defined and redefined dynamically. Since each tier (or group) is represented as a single bit, and the tiers are defined to be relevant to the service offering at a given point in time, they offer the most compact representation possible for the user's access rights. Compactness is very important, since the access rights must be stored in a limited amount of secure memory and must be transmitted frequently, and as such bandwidth requirements are minimized.

One or more objects may be associated with a given service/application and assigned to the corresponding tiers. Additionally, while such authorization rights may be stored on a server at the other end of the network (as opposed to at the set-top terminal), where a set-top terminal may query its rights by communicating with the server in real time, it is typically advantageous to distribute this information within the set-top terminals for security, robustness, and performance, as well as minimizing single point of failure effects. Once the event (or "program") terminates, or once the object(s) is no longer offered as part of a particular service, the tier definition will be updated to reflect this change. The authorization tiers for which the subscriber has been authorized are conveyed in a corresponding Entitlement Management Message (EMM) (described in further detail below in the description of FIG. 1, step 50).

There are two common types of tiers. The first type is a Subscription tier which is associated with a service (and corresponding objects) that continues over a duration of time and which is purchased ahead of actual use. The second, an Impulse Pay Per Use tier (IPPU, analogous to the Impulse Pay Per View for video programming), allows for an impulse purchase of an object or set of objects associated with a given service/application and may have a time duration associated with it. It will be appreciated by those skilled in the art that other usages, combination or conditional, can be based on these two tiers.

Referring once again to step 20 in FIG. 2, the fingerprint to service tier association may be assigned by the MSO using an additional conditional access (CA) controller together with the existing access controller(AC). The MSO's existing AC may comprise, for example, a Digital Access Controller (DAC) available from General Instrument Corporation of Horsham, Pa. USA. The additional CA subtends signature functionality specific to objects associated with MSO's network. This function can be facilitated by the object authentication/signature device (OASD) when it is acting as a subtending device to the MSO's AC. As previously mentioned, OASD functionality may be embodied in an independent device (software and hardware), which in turn would communicate with the AC or the DAC to obtain the access requirement assignments (corresponding tiers for that object).

The additional MSO specific signature takes the signature of a previously signed object (i.e., the fingerprint or "digital signature" generated by the OASD), and adds a unique object identifier to it (if an MSO-specific object identifier is required). It also adds any one or more entitlement tier bits, which define the access requirements associated with the corresponding software object, and an envelope signature for the entire structure, referred to hereafter as the entitlement control structure (ECS). This unique and secret encoding of the ECS is shown in step 22 of FIG. 2.

The ECS may contain the access requirements for the object and associated resources or it may be partitioned into two ECS's, one for the access requirements for the object and another for the resources. The latter approach is typically a more appropriate approach if the resource authorization is independent of a given object and is being performed on a set-top wide basis. However, either approach may be utilized (i.e., a combined ECS or two separate ECS's) and has no impact on how the authorization steps are performed.

The cost and free-use period, along with global set-top terminal resource restrictions, for example, may be assigned by this device as specified by the AC or the DAC (which in turn may be specified via the Billing System interface). These parameters are also conveyed as part of the ECS within the ECM.

The functionality of the OASD and the MSO's signing and creation of the ECS (steps 10–24) may be combined into a single device as the preferred embodiment, subtending to the AC or the DAC, since it is the simpler case. Either way, the physical product partitioning should not alter the functional steps that need to be performed (it may optimize these steps however).

Continuing to step 26 of FIG. 2, at the MSO, the collection of unique ECS's form an association table, that is made available to a national m local download function (Downloader) associated with the AC or the DAC, respectively, and is downloaded to the digital set-top terminal (either in its entirety, or one entry at a time in an appropriate message, when downloading). Whenever the Downloader downloads protected software objects it provides the digital set-top terminal with the secret "software object fingerprint to service tier association" (ECS), which is preferably encrypted by known means before transmission. The Downloader downloads the software object in a carousel fashion while the ECS in the associated ECM's may be sent independently. It will be appreciated by those skilled in the art that this independence provides an additional security measure.

Applicants note that in an alternative embodiment of the invention, if authorization is not required, the ECS may then effectively consist of the ECR only (i.e., step 20 of FIG. 2 is not performed). The ECS in such an embodiment is piggybacked onto the downloaded object. The set-top terminal examines the ECS to perform the authentication check. The set-top download function downloads the first N bytes of the object (as indicated by the header information accompanying the downloaded object) and ignores the trailing bytes that comprise the ECS. However, the preferred embodiment described above is preferable to this embodiment for two reasons: first, the coupling of the ECS to the object removes a desirable security measure, and second, this embodiment introduces inconsistent processing between an ECS which contains only the ECR and that which contains the ECR and the service tier association. The preferred embodiment, however, does not restrict how the ECS may be conveyed, nor does it restrict the ECS to the type of message that specifies it (EMM or some other control message).

Again returning to the description of step 26 of FIG. 2, the Downloader may be part of the AC or the DAC since a can be viewed as a software task, or alternatively, it can be separate from the DAC, i.e., a software task running on its own hardware platform.

The MSO then controls the set-top terminal access to a specific service and associated object or set of objects by using the previously mentioned Entitlement Management Messages (EMM's) specific to that set-top terminal. This is accomplished using the AC or the DAC (both are hardware and software devices) via parameter settings from the billing system and based on the customer profile. These messages also establish whether the set-top terminal is allowed to utilize that software object and may also specify which set-top terminal resources (e.g., communication ports, printer port, keyboard, etc.) the object is allowed to use (when subscriber level control is desired). Additionally, the AC or the DAC may selectively assign an Impulse authorization tier (and convey the setting via the same message) to facilitate immediate authorization of the requested resource when the subscriber explicitly requests that the resource be authorized. In the case where a resource is authorized, as in Impulse-authorizable resource (by associating it with an impulse tier in the message), the user may request an impulse (i.e., immediate) authorization of this resource, thereby preventing the subscriber (user) from needing to call the MSO for such authorization.

Finally, in step 28, The AC or the DAC sends the EMMs to each and every set-top terminal to enable it to download and utilize the object(s). More specifically, when resource control is desired for a single object globally across all set-tops, the permission list for the resource control may reside in the ECS; otherwise the permissions (access rights) are conveyed to each set-top individually in an EMM. The Access Controller (or DAC) then sends the entitlement to the set-top terminal that is authorized to receive this service and associated objects (again, these entitlements are assigned in the previously described EMM's).

A system routine is created and provided in the set-top terminal, and is invoked whenever the set-top terminal is to check the authorization rights and authenticity of the software objects associated with the requested service. This system routine may be part of the core code (BIOS) in the set-top terminal. It may also be provided within the operating system (OS), or middleware. When downloading the operating system or the JVM for example, the resident routine is invoked to check authorization rights prior to download and, if so, authenticate these objects after download. A second authentication stage may also be present (for some objects) to check if utilization/launch of these objects is allowed. Once the operating system is loaded, any subsequent object utilization that involves the operating system or the JVM invokes the equivalent authorization and authentication routine in the OS.

More specifically, the set-top terminal. authenticates and authorizes a downloaded object using the EMM's and ECM's associated with a given set-top terminal and object respectively. The set-top may check the authorization rights against the authorization requirements of the software object prior to downloading the object, upon downloading the object, or whenever the object is about to be utilized. Subsequent authorization checks are optional.

Figure 3:
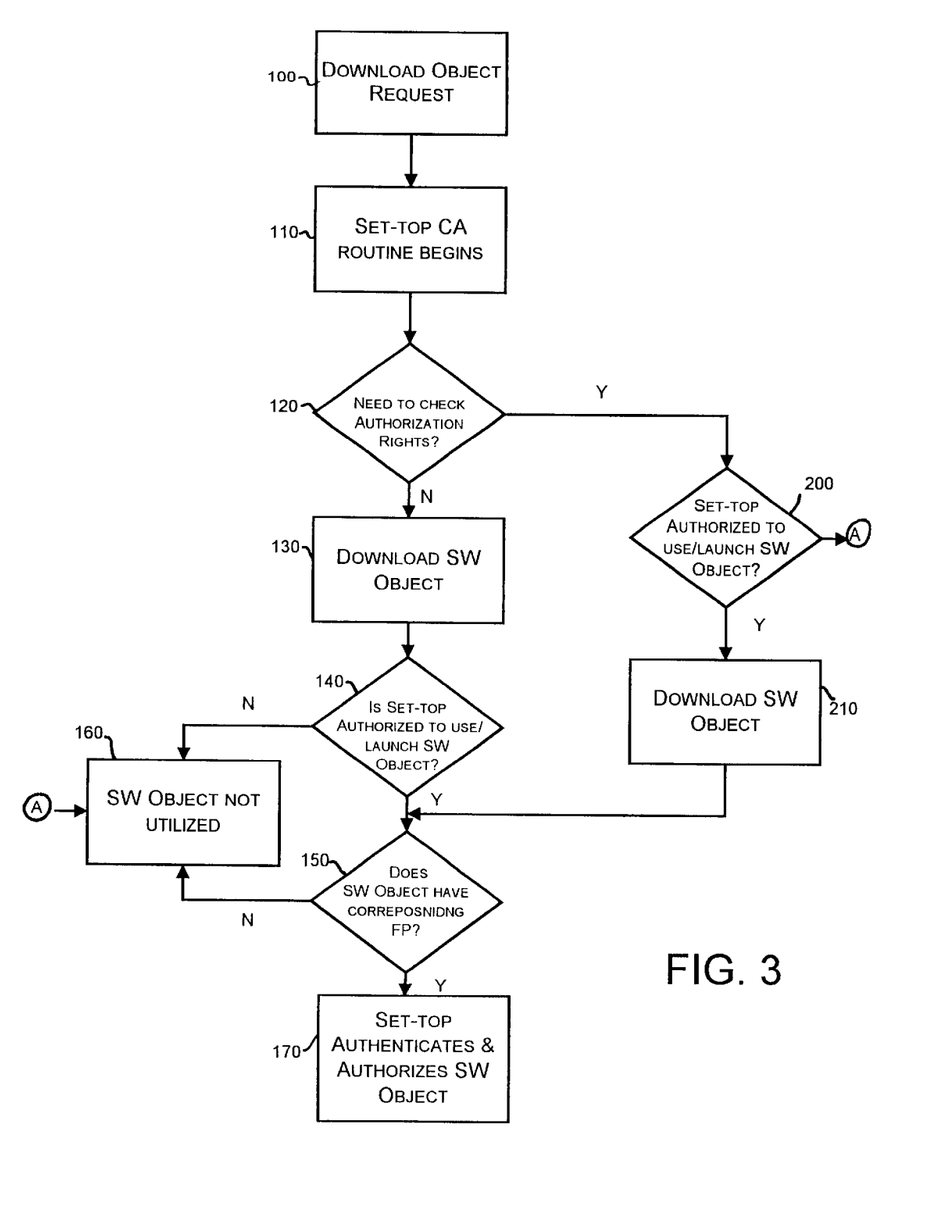
FIG. 3 is a simplified flowchart illustrating the steps performed by a Conditional Access (CA) routine at a set-top terminal, upon invoking a software object.

FIG. 3 is a flowchart illustrating the steps performed at a set-top terminal upon invoking a software object. A download request occurs at step 100. Thereafter, in step 110, the BIOS, operating system and/or the Java Virtual Machine (JVM), when requiring the download or the use of a software object, call(s) the set-top CA routine for an authentication and authorization check. The use or launch of the object is allowed only if the check passes. The CA check is facilitated by the secure processor provided in the set-top. In addition, a lifetime feature may be implemented, wherein the secure processor records the object lifetime and checks it for expiration, starting for example with first use (i.e., the first time the secure processor was engaged in authenticating and authorizing the object). If the object is expired, the secure processor may interrupt the operating system or JVM to disable/delete the object(s). If any of the checks fail, the set-top terminal may log the results to report back to the access controller. Again, this feature is preferably implemented using a combination of software and hardware functions.

More specifically, as indicated in step 120 of FIG. 3, a determination is made as to whether or not there is a need to check authorization rights. If not, the software object may be downloaded to the set-top terminal prior to any authorization as indicated at step 130. In the event a determination is made at step 120 that authorization rights need to be checked, the routine proceeds to step 200 where the Conditional Access (CA) routine, before downloading the object, may determine if the set-top terminal is authorized to download the ,object. This step is optional and may depend upon the nature of the software object (i.e., some objects are necessary and may not require this prior authorization). If step 200 is performed, and if a determination is made that the set-top terminal is authorized to download the object, the routine continues to step 210. If however, a determination is made in step 200 that the set-top terminal is not authorized to download the object, the process continues to step 160, in which case the object is not utilized.

In step 210, the software object is downloaded to the set-top terminal and the routine continues to step 150 for authentication, described in further detail below.

Alternatively, again if a determination was made in step 120 that there was no need to check authorization rights, the software object is downloaded (step 130) and as shown in step 140, the Conditional Access (CA) routine determines if the set-top terminal is authorized to use/launch the software object. Based on the determination, the software object may or may not be utilized. All unauthorized software objects will not have a corresponding tier association. The encoded "fingerprint of the software object to tier value" association (ECS) of the software object (or "application" in this example) is known only to the MSO and by definition is unique to each software object and is protected. Accordingly, if a determination is made in step 140 that the set-top terminal has not been authorized to use/launch the software object, the process continues to step 140, where the software object is not downloaded (or utilized). If the tier corresponding to the software object has been authorized however, the process continues to step 150.

At step 150 the CA routine, again with the assistance of the secure processor, checks to see if the software object has the corresponding fingerprint association. Depending on the result, the software object may or may not be utilized. For example, all unauthorized software objects will not have a corresponding fingerprint (since an unauthorized software object cannot "guess" the corresponding ECR value). In that case, the process continues-to step 160, where the software object is not used. The protected fingerprint of the software object is known only to the MSO and by definition is unique to each software object. If the software object has the corresponding fingerprint association, the routine continues to step 170, where the set-top terminal authorizes and authenticates the downloaded object.

It will be appreciated by those skilled in the art that each of the authorization steps illustrated in steps 140 and 200 of FIG. 3 are optional and are not necessarily performed. In addition, although the authorization check performed in step 200 continues to step 210 and then to the authentication of step 150, additional subsequent checks could be performed by the CA routine and are well within the scope of the invention.

In addition, in a second embodiment of the invention, if the software object requires the utilization of a given set-top terminal resource, a similar checking process to determine if the software object has permission to use the required resources may occur. These permissions (authorization rights) may be associated with a given object for all set-top terminals or may be associated with a given object for a specific set-top terminal. The authorization rights to use the set-top terminal resources are conveyed in a similar manner, via EMM's.

As noted above, the authorization rights may also be designated as Impulse tiers to indicate that the subscriber may request the immediate authorization of the Impulse authorizable resource. The set-top in turn checks the request in a similar manner and if the Impulse tier is set, it registers the authorization as having taken place (for possible subsequent billing purposes).

Figure 4:
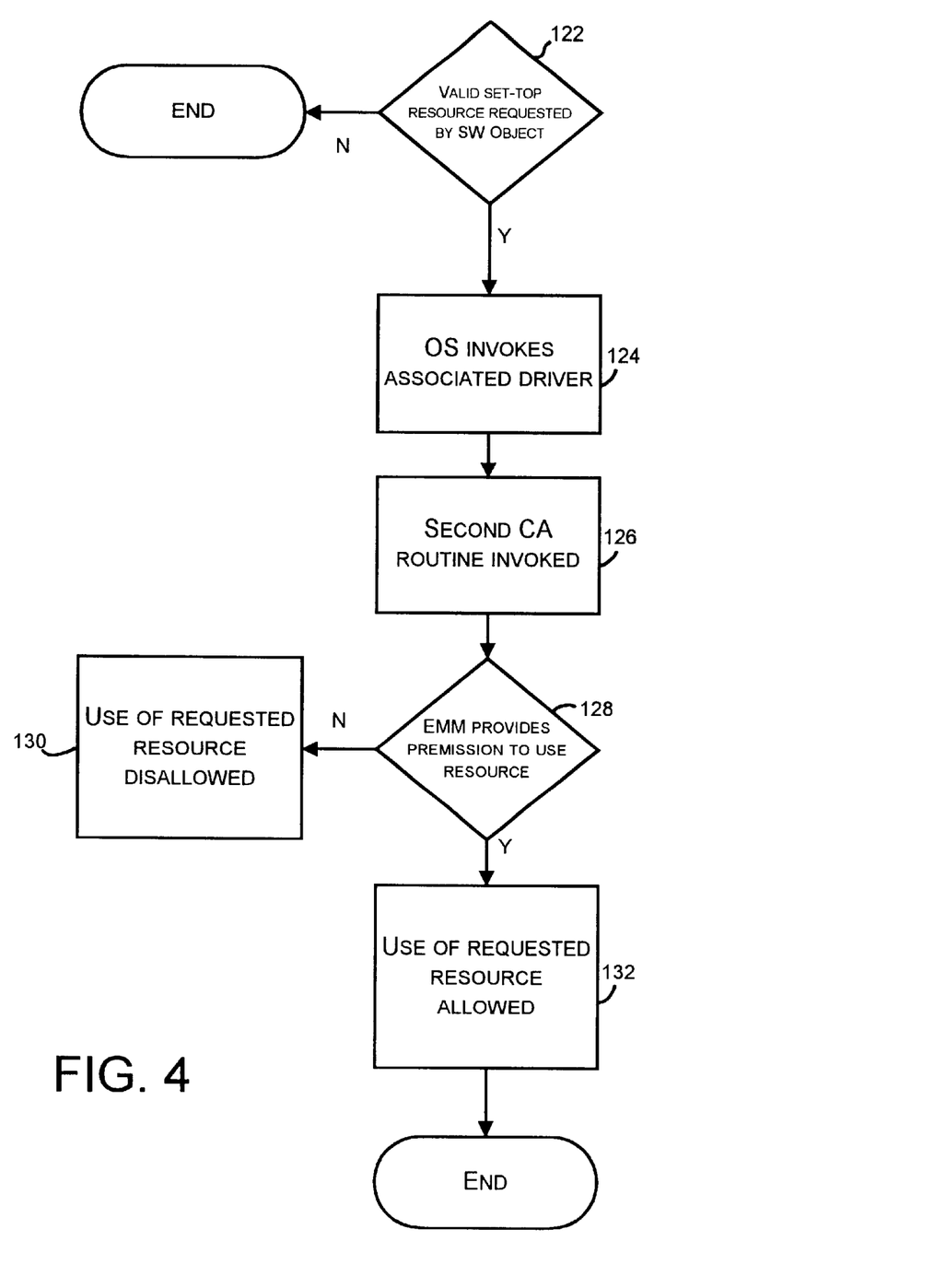
FIG. 4 is a simplified flowchart illustrating the additional steps performed by a second Conditional Access (CA) routine in another embodiment of the invention.

Each of these options is shown in FIG. 4 where in step 122, a determination is made as to whether a set-top terminal resource is requested by the software object (i.e., whether the software object has requested resource utilization via the OS). If it is determined at step 122 that a valid set-top terminal resource has not been requested, no further action is taken.

If, however, step 122 determines that a valid set-top terminal resource has been requested, the process continues to step 124 in which the OS invokes the driver associated with the requested set-top terminal resource. Continuing to step 126, the associated driver (upon the first use only of the resource) invokes a "second Conditional Access routine" (which may be part of the BIOS or the operating system) to determine if the requesting software object is allowed to use this resource.

More specifically, the driver routine calls the second access control routine which, in conjunction with the secure processor, determines whether the software object may utilize the requested resource (i.e., determines if it is authorized for such use). The resource usage authorization rights are stored in secure memory as well. Specifically, in step 128 a determination is made as to whether the EMM provided permission to use the requested resource. If the EMM did not provide such permission, the routine disallows the use of the requested resource as indicated at step 130 (i.e., the control goes back to the driver and then to the OS with a negative result, indicating that use of the requested resource is not allowed). However, if the EMM provided permission, the utilization of the requested set-top resource is allowed in step 132.

In addition, in the case where the permissions are set as Impulse tiers (requiring an explicit request from the user for the authorization to take effect), the routine grants the authorization and registers the Impulse request within the secure processor (for possible subsequent billing purposes via a report back mechanism to the AC or the DAC).

In a still further aspect of a preferred embodiment of the invention, the driver associated with a requested resource may invoke the second CA routine only upon the first use of the resource by the software object, wherein subsequent invocations of the second conditional access routine are optional.

Finally, it will be appreciated by those skilled in the art that various methods may he implemented in order to detect any tampering to circumvent the processes described above. These methods may include, without limitation, periodic background checks of the software object memory, fingerprint (which may include memory size, checksum, etc.), including the set-top terminal care BIOS, operating system, etc., against pre-calculated and protected values for each. For example, the set-top terminal's secure processor can perform a memory checksum on certain critical components of the software in conjunction with the user processor. This may be done whenever the user processor and the secure processor have sufficient idle time to perform this function, thereby minimizing adverse performance effects on other functions. Such a checksum verification may also be invoked at the operator's request via a received command message (e.g., from the MSO's controller), in the event that the MSO wants to verify the integrity of the software as part of a troubleshooting or monitoring process. The secure processor has the cryptographic checksum of the software component to be checked. The user processor, under the control of the operating system, passes the memory segments comprising this object to the secure processor.

If the secure processor determines that the check has failed, it may embody the status in an encrypted format, which is incorporated in a message that is sent to, e.g., the MSO's controller. The reliance on the user processor for this purpose may be minimized to ensure that these operations cannot be intercepted. In addition, in the event that a deviation such as tampering or a transmission error is detected, additional indications may be provided. For example, the unique address of the set-top terminal may be provided to the MSO/headend in order to shut off all or some of the subscriber's services. Alternatively, a local or national Access Control Center may be notified of the event, its time, the unique set-top terminal address, the geographic location of the terminal, etc. Such notification will allow appropriate corrective action to be taken.

As should now be apparent, the above described method creates a signature and associates the signature with the software object that is downloaded for use by the user terminal (e.g., set-top). The conditional access subsystem at the user terminal includes the appropriate routines to examine the validity of the signature by comparing the signature value (s) sent from the system operator (e.g., headend) to a signature value (s') generated locally in the user terminal once the object has been downloaded. However, if this comparison fails, there is no way of determining whether (i) the downloaded object is suspect or (ii) the received signature value is suspect.

Figure 5:
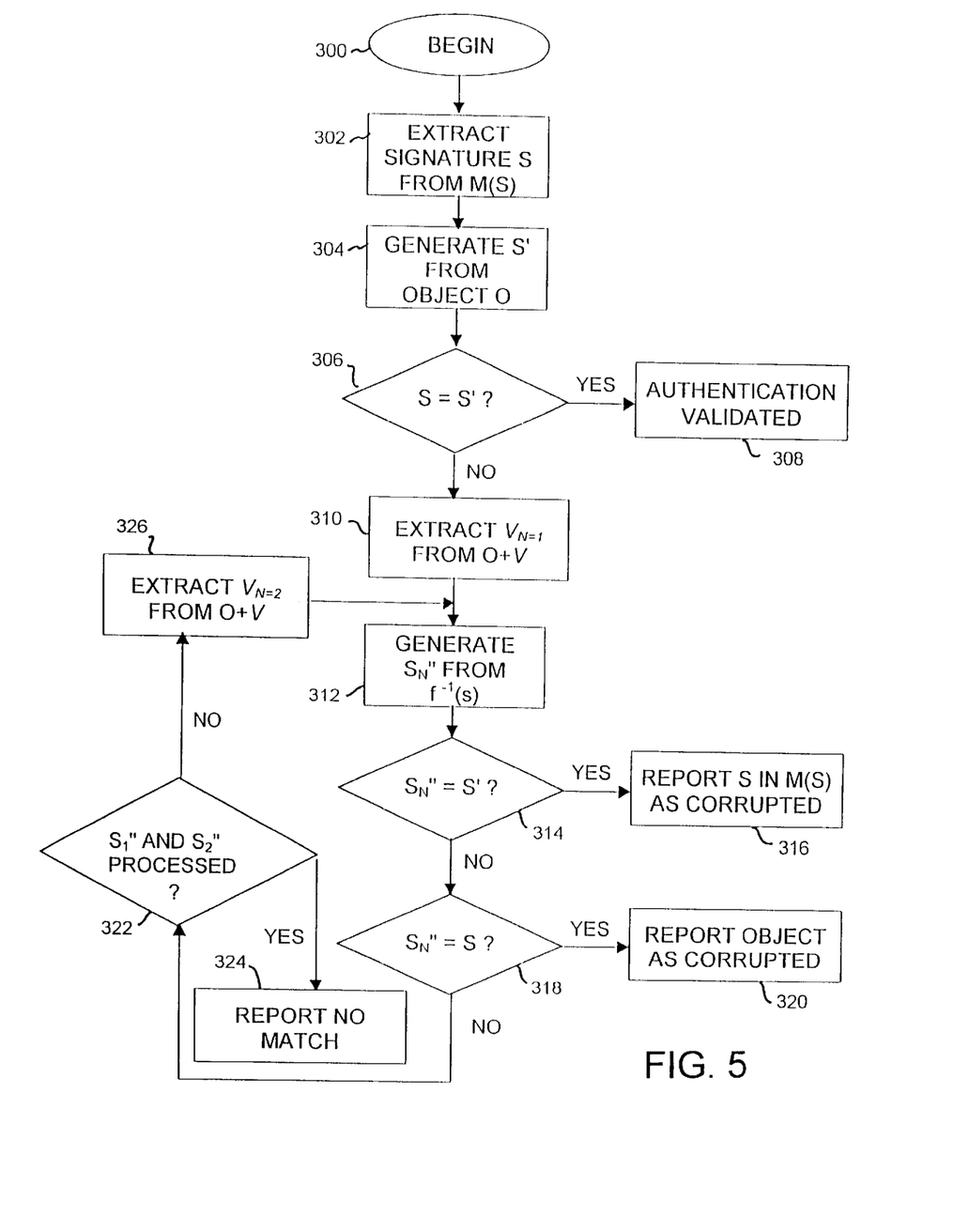
FIG. 5 is a flowchart illustrating a routine in accordance with the invention for determining the source of an authentication failure at a user terminal.

The present invention provides such a determination using the routine illustrated in FIG. 5. The routine commences at box 300. At step 302, the signature value "s" sent by the system operator is extracted from a message M(S) that sends the signature value to the user terminal. It is noted that M(S) also carries other parameters which are not relevant to the present discussion.

At step 304, the local signature value "s'" is generated from the downloaded software object O. Then, at step 306 a determination is made as to whether s=s'. If so, then the authentication has been validated as indicated at box 308. Otherwise, a value v of a signature transformation function f(s) is extracted from the downloaded software object O to which the value v is appended (O+v). The function f(s) is a compact transformation function that operates on (s) and is known only to a trusted party, such as the manufacturer of the system apparatus. For example, f(s) can be a particular hashing function (e.g., incorporating the well known Digital Encryption Standard (DES)) that has a readily determinable inverse function $f(s)^{-1}$. Any other suitable function can be used, as will be appreciated by those skilled in the art, and the invention is not dependent on any particular type of function.

It is further noted that more than one instance of v can be appended to the downloaded software object. For example, v may be appended at the beginning and at the end of the object O for redundancy. This reduces the chances of receiving only a suspect v at the user terminal. For purposes of the present discussion, a first of two instances of v appended to the object is referred to as $v_1$ and the second instance is referred to as $v_2$.

In FIG. 5, the first instance $v_{N=1}$ is extracted from the object at step 310. A signature value s" (referred to in the Figure as $s_N$", i.e., sit in the case of $v_1$) is generated by applying the inverse $f(s)^{-1}$ of said signature transformation function f(s) to the extracted value v, as indicated at step 312. Then, at step 314, a determination is made as to whether $s_N$"=s'. If so, at step 316 the signature value s in M(S) is designated as suspect, since $s_N$" will be the same as s' only in the event that (i) authentication failed at step 306 and (ii) s is suspect.

In the event that $s_N$"≈s', a determination is made at step 318 as to whether $s_N$"=S. If so, then at step 320 the object O is designated as being suspect, as a failure of the authentication at step 306 coupled with the condition $s_N$=s can only mean that the object is suspect.

However, if $s_N$" does not equal either s or s', then there is a strong possibility that both s and the downloaded software object O are suspect, although it is also possible that $s_N$" is suspect. Where two instances of the value v are appended to the software object, a second test is made on $v_2$ in order to reduce the likelihood that $v_1$ was suspect when the results of testing with $v_1$ were inconclusive. At step 322, a determination is made as to whether both $s_1$" and $s_2$" have already been processed. If so, then at step 324, a no match condition is reported. In this instance, both the signature s and the object O are probably suspect, although this is not definite. If both $s_1$" and $s_2$" have not already been processed, the second instance of the value v, i.e., $v_2$ is extracted from the point where it is appended to the downloaded software object O, as indicated at step 326. Then, $s_2$" is generated from $v_2$ at step 312, and the routine continues as described in connection with the processing of $v_1$.

Figure 6:
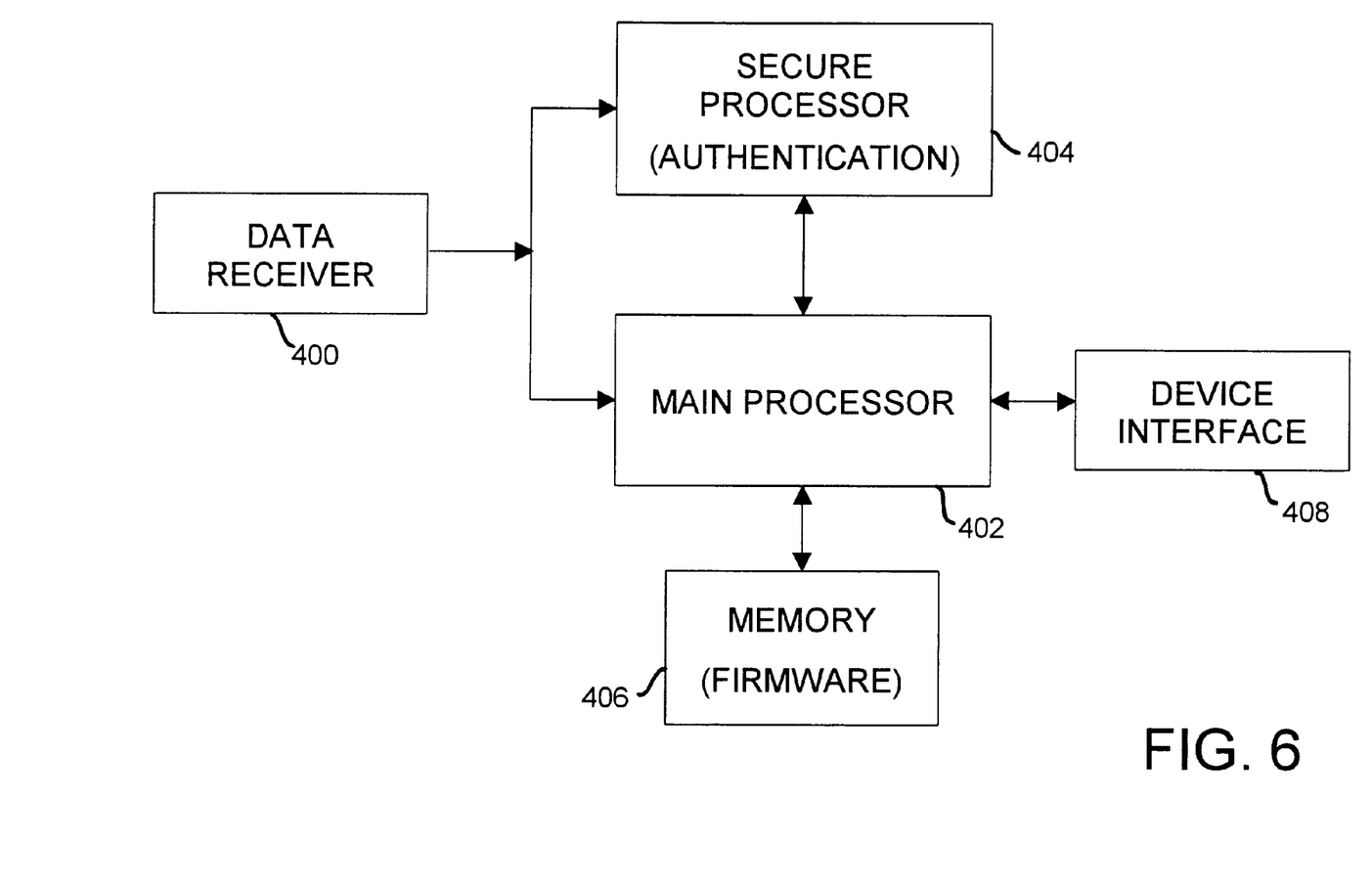
FIG. 6 is a functional block diagram of the relevant blocks in a user terminal (e.g., set-top) in which the invention can be implemented.

FIG. 6 illustrates relevant portions of a user terminal, such as a television set-top box, in block diagram form. A data receiver 400 receives the data stream that carries the software object to be downloaded. It also receives the message M(S) that carries the signature value s. A main processor 402 (e.g., a microprocessor) is provided to execute firmware stored in a memory 406. The firmware includes the routines illustrated in the flowcharts of FIGS. 3, 4 and 5. The main processor will typically execute all of the non-security related functions.

A secure processor 404 provides the authentication functions described above, although some of these functions may also be shared with main processor 402 depending on the particular implementation chosen. A device interface 408 is provided in a conventional manner. This interface may include, for example, a video processor for a video display, an audio processor, an RF modulator for a television, an on-screen display processor, and the like. Interface 408 may also include an infrared receiver for receiving remote control and/or alphanumeric commands from a user.

It should now be appreciated that the present invention provides a technique for determining whether a failed authentication resulted from corruption (e.g., by tampering) in the downloaded object or from corruption of the separately communicated signature for the downloaded object. A compact transformation function that operates on the signature is used to generate a value indicative of the signature at the software object transmission facility. The inverse function is used at the user terminal, such as a television set-top box, which downloads the software object. Multiple transmission of the value can be provided for redundancy. The system is particularly useful in-analyzing actual or attempted attacks on the security of the scheme used to download the software object.

Although various embodiments are specifically illustrated and described herein, it will be appreciated that modifications and variations of the present invention are covered by the above teachings and are within the intended scope of the appended claims.

What is claimed is:

1. A method for analyzing a failed software object authentication to determine whether a downloaded software object or a signature for the software object is suspect, comprising the steps of:

extracting a transmitted software object signature value s from a message m(s) carrying the signature value;

calculating an object signature value s' from the software object, said software object being transmitted separately from said message m(s);

extracting from the software object a value v of a signature transformation function f(s);

generating a signature value s" by applying the inverse $f(s)^{-1}$ of said signature transformation function f(s) to the extracted value v;

comparing said signature value s" to at least one of said transmitted software object signature value s and said calculated object signature value s';

designating said signature value in message m(s) as suspect if s"=s';

designating said software object as suspect if s"=s; and reporting back to a network access controller whether (1) the signature is suspect; (2) the software object is suspect; or (3) the signature and software object are suspect.

2. A method in accordance with claim 1 wherein said function is a secret function.

3. A method in accordance with claim 1 wherein:

first and second copies of said value v are carried at different locations of said software object for redundancy;

each of said copies is extracted from said software object;

said signature value s" corresponds to the first copy of said value v;

a second signature value $s_2$" is generated for the second copy of said value v;

said method comprising the further steps of:
- comparing said signature value $s_2''$ to at least one of said transmitted object signature value s and said calculated object signature value s';
- designating said signature value in message m(s) as suspect if $s_2''=s'$;
- designating said software object as suspect if $s_2''=s$; and
- designating both said software object and said message m(s) as suspect if $s_2''$ does not equal either s' or s.

4. A method in accordance with claim 3 wherein said value v is appended at the beginning of said software object and at the end of said software object.

5. A method in accordance with claim 1 wherein both said software object and said message m(s) are designated as suspect if s" does not equal either s' or s.

6. A method for authenticating a downloaded software object, comprising the steps of:
- extracting a transmitted software object signature value s from a message m(s) carrying the signature value;
- calculating an object signature value s' from the software object, said software object being transmitted separately from said message m(s);
- comparing said transmitted software object signature value s to the calculated object signature value s';
- if the values s and s' are equal, designating said authentication as successful; and
- if the values s and s' are not equal:
  - comparing said calculated object signature value s' to a signature value s", said signature value s" being obtained by:
    - (i) extracting from the software object a value v of a signature transformation function f(s), and
    - (ii) generating s" by applying the inverse $f(s)^{-1}$ of said signature transformation function f(s) to the extracted value v;
  - designating said signature value in message m(s) as suspect if s"=s';
  - designating said software object as suspect if s"=s; and
  - reporting back to a network access controller whether (1) the signature is suspect; (2) the software object is suspect; or (3) the signature and software object are suspect.

7. A method in accordance with claim 6 wherein said function is a secret function.

8. A method in accordance with claim 6 wherein:
- first and second copies of said value v are carried at different locations of said software object for redundancy;
- each of said copies is extracted from said software object;
- said signature value s" corresponds to the first copy of said value v;
- a second signature value $s_2''$ is generated for the second copy of said value v;
- said method comprising the further steps of:
  - comparing said signature value $s_2''$ to at least one of said transmitted object signature value s and said calculated object signature value s';
  - designating said signature value in message m(s) as suspect if $s_2=s'$;
  - designating said software object as suspect if $s_2''=s$; and
  - designating both said software object and said message m(s) as suspect if $s_2''$ does not equal either s' or s.

9. A method in accordance with claim 8 wherein said value v is appended at the beginning of said software object and at the end of said software object.

10. A method in accordance with claim 6 wherein signatures of both said software object and said message m(s) are designated as suspect if s" does not equal either s' or s.

11. A user terminal for receiving and authenticating software objects from a communications network, comprising:
- at least one computer processor;
- a memory coupled to said computer processor(s) for storing software utilized by said processor(s) for authentication of the a received software object;
- said software including a routine for (i) extracting a transmitted software object signature value s from a message m(s) carrying the signature value and (ii) calculating an object signature value s' from the received software object said software object being transmitted separately from said message m(s); and
- a comparison operation adapted to compare said transmitted software object signature value s to the calculated object signature value s';
- wherein:
  - if the values s and s' are equal, said authentication is designated as being successful; and
  - if the values s and s' are not equal, said calculated object signature value s' is compared to a signature value s", said signature value s" being obtained by:
    - (i) extracting from the software object a value v of a signature transformation function f(s), and
    - (ii) generating s" by applying the inverse $f(s)^{-1}$ of said signature transformation function f(s) to the extracted value v;
  - said signature value in message m(s) is designated as being suspect if s"=s';
  - said software object is designated as being suspect if s"=s; and
  - reporting back to a network access controller whether (1) the signature is suspect; (2) the software object is suspect; or (3) the signature and software object are suspect.

12. A user terminal in accordance with claim 11 wherein both said software object and said message m(s) are designated as suspect if s" does not equal either s' or s.

13. A user terminal in accordance with claim 11 wherein:
- first and second copies of said value v are carried at different locations of said software object for redundancy;
- each of said copies is extracted from said software object;
- said signature value s" corresponds to the first copy of said value v;
- a second signature value $s_2''$ is generated for the second copy of said value v;
- said signature value $s_2''$ is compared to at least one of said transmitted object signature value s and said calculated object signature value s';
- said signature value in message m(s) is designated as suspect if $s_2''=s'$;
- said software object is designated as suspect if $s_2''=s$; and
- both said software object and said message m(s) are designated as suspect if $s_2''$ does not equal either s' or s.

14. Apparatus in accordance with claim 13 wherein said user terminal comprises a television set-top box.

15. Apparatus in accordance with claim 11 wherein said user terminal comprises a television set-top box.

* * * * *